United States Patent [19]

Brendgord et al.

[11] Patent Number: 4,687,215
[45] Date of Patent: Aug. 18, 1987

[54] APPARATUS FOR TRANSPORTING WHEELED CARRIERS

[75] Inventors: Thomas Brendgord, Erie, Pa.; George E. Otte, Calabash, N.C.

[73] Assignee: American Sterilizer Company, Erie, Pa.

[21] Appl. No.: 766,749

[22] Filed: Aug. 16, 1985

[51] Int. Cl.⁴ .................................................. B62B 3/10
[52] U.S. Cl. .................................. 280/79.1 R; 211/71; 211/126; 248/129; 280/81 B
[58] Field of Search ............... 280/79.1 R, 79.1 A, 280/81 B, 79.2, 79.3, 47.34, 47.35, 33.99 R, 47.18; 211/22, 33, 71, 126, 44; 414/498; 186/27, 45; 248/98, 129

[56] References Cited

U.S. PATENT DOCUMENTS

| | | | |
|---|---|---|---|
| 1,966,751 | 7/1934 | Brefeld | 280/79.3 |
| 2,081,216 | 5/1937 | Bosserman | 211/44 |
| 2,828,826 | 4/1958 | Riemenschneider | 280/79.3 |
| 4,052,084 | 10/1977 | Propst | 211/126 |
| 4,084,714 | 4/1978 | Williams | 414/498 |
| 4,277,075 | 7/1981 | Shay | 280/79.1 A |

Primary Examiner—John J. Love
Assistant Examiner—Eric D. Culbreth
Attorney, Agent, or Firm—Robert D. Yeager; George D. Dickos

[57] ABSTRACT

An apparatus for simultaneously transporting a plurality of wheeled carriers is provided. First and second end frames are interconnected by central spine elements from which extend a plurality of arms which define discrete cells configured to accept the individual carriers. Straps between the end frames and arms or between arms are provided to secure the carriers to the transportation apparatus. In use, the wheeled carriers may be moved as a group while allowing a carrier to be removed from or inserted into any cell without disrupting the other carriers and without necessitating the carriers themselves being placed on a larger wheeled carrier for transport.

3 Claims, 4 Drawing Figures

APPARATUS FOR TRANSPORTING WHEELED CARRIERS

BACKGROUND OF THE INVENTION

1. Field of the Invention

The present invention relates to the transportation of articles within wheeled carriers and, in particular, to an apparatus for moving a plurality of such carriers together while allowing any individual carrier to be readily removed from the group.

2. Description of the Prior Art

In modern materials handling situations a myriad of applications exist in which articles to be transported are placed on or within a wheeled carrier such as an open cart, an enclosed compartment, or the like. Frequently, it is expedient to move a plurality of such carriers simultaneously. For example, often in the hospital environment it is desirable to move a number of wheeled carriers transporting items such as medication, supplies or the like to various areas of the hospital. Heretofore, with many types of carriers the maximum number of wheeled carriers that could be manually moved by an individual was two, e.g., by pushing one and pulling the other. Obviously, such a limiting of the number of carriers capable of being transported together to two is a most inefficient means of moving a bulk amount of material.

If, on the other hand, some mechanical means of propulsion were employed, a greater number of carriers could be moved at once. However, the principal previous method of moving a plurality of wheeled carriers simultaneously was by attaching them to one another in a single-file configuration thereby forming a train. However, it will be readily appreciated that when articles are transported in carriers which are formed into trains, such carriers may only be removed or added to the train sequentially. For example, if the third carrier in a train is to be removed from the train prior to the succeeding carriers, all such succeeding carriers must first be disconnected from the train and then reconnected thereto after the desired carrier is removed. Clearly, such practices are inefficient, costly, time consuming and labor intensive.

Of course, another method of moving a plurality of wheeled carriers is to place all of the carriers themselves on a wheeled cart, or the like. However, such a scheme would require a much larger cart than the carriers themselves in order that such cart could support the weight of all of the carriers. In addition, means would also be required to load and unload the carriers to and from any such cart. Obviously, such a system utilizing a larger cart would be most costly and inefficient.

The subject invention is directed toward an apparatus for transporting a plurality of wheeled carriers together as a group while allowing the flexibility to remove one carrier from the group without necessitating the disruption of the entire group.

SUMMARY OF THE INVENTION

In accordance with the present invention, there is provided apparatus for simultaneously transporting a plurality of wheeled carriers. The apparatus provided includes vertical first and second end frames having wheels affixed thereto and upper and lower spine elements affixed between the frames. A plurality of arms extend horizontally perpendicular from the respective spines to define discrete cells within which the carriers may be transported. Means, such as straps, are provided to withhold the carriers within their respective cells.

As such, the present invention provides solutions to the problems associated with simultaneously transporting a plurality of wheeled carriers. In addition, the instant apparatus allows one or more carriers to be removed from the group without disrupting the other carriers in the group. Accordingly, the present invention provides a most cost efficient, yet flexible, solution to the above-described materials handling problems while avoiding the disadvantages of the cumbersome and costly alternative of placing all carriers on a secondary cart or forming a train of carriers.

These and other details, objects and advantages of the invention will become apparent as the following description of the present preferred embodiment thereof proceeds.

BRIEF DESCRIPTION OF THE DRAWINGS

In the accompanying drawings, I have shown a present preferred embodiment of the invention wherein.

DETAILED DESCRIPTION OF THE PREFERRED EMBODIMENTS

Figure 1:
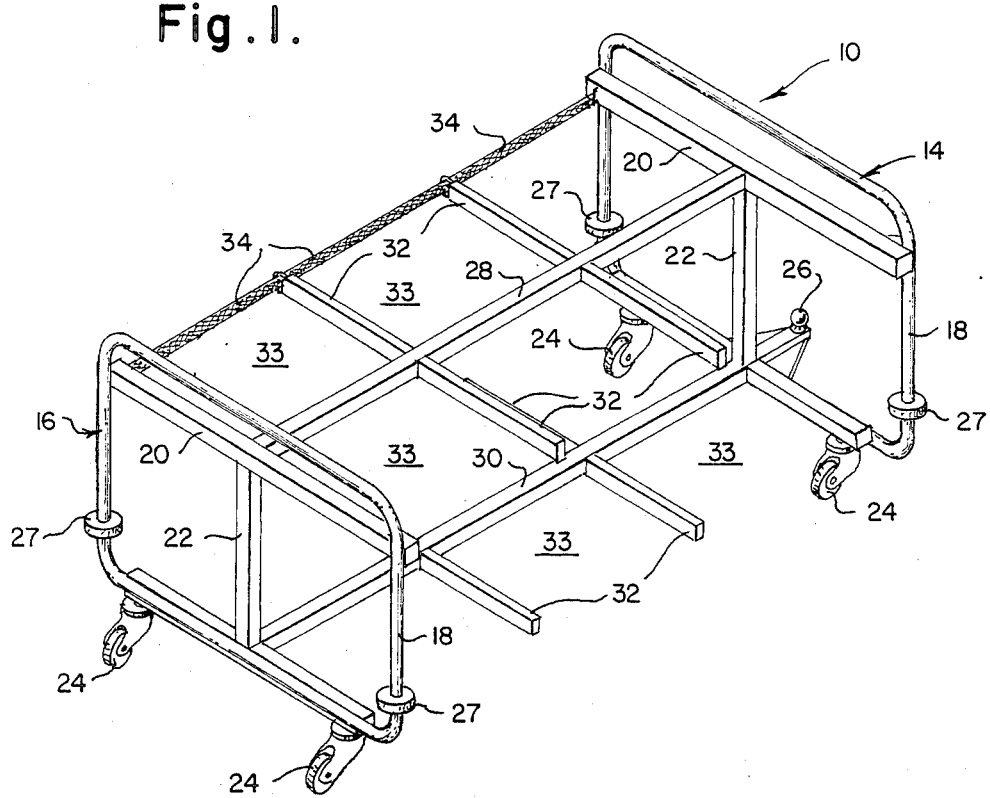
FIG. 1 is a perspective view of the apparatus provided herein for the transportation of a multiplicity of wheeled carriers.
Figure 4:
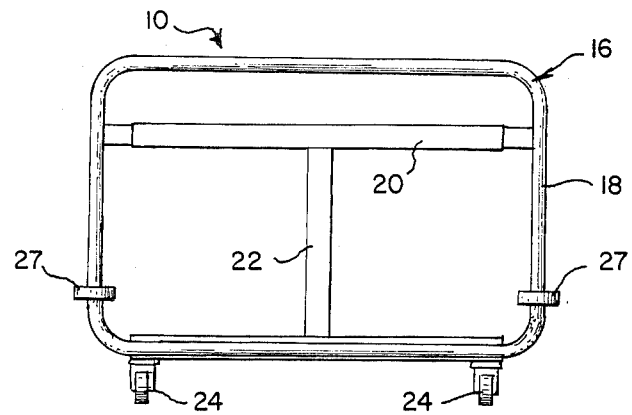
FIG. 4 is an end elevation view of the apparatus disclosed herein.
Figure 3:
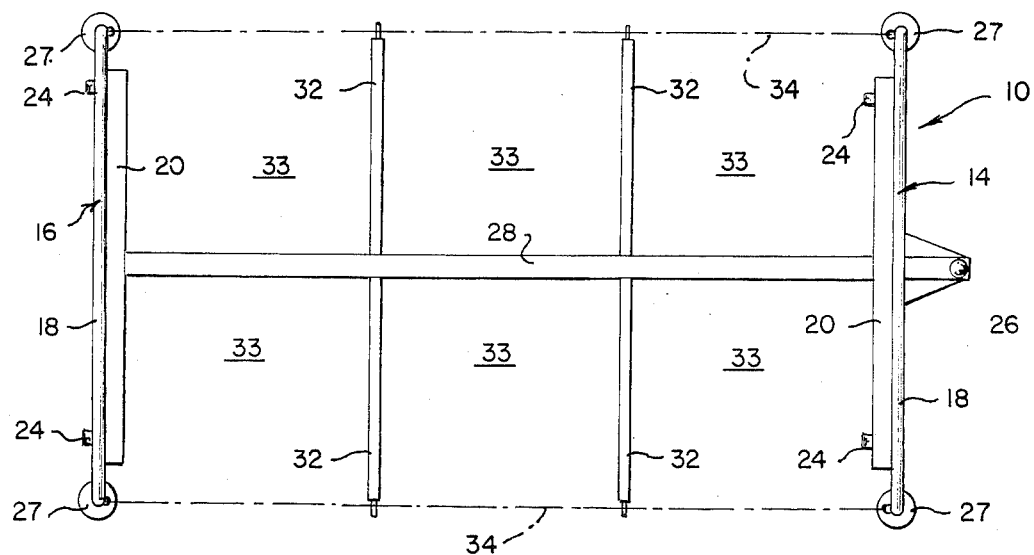
FIG. 3 is a plan view of the apparatus disclosed herein.
Figure 2:
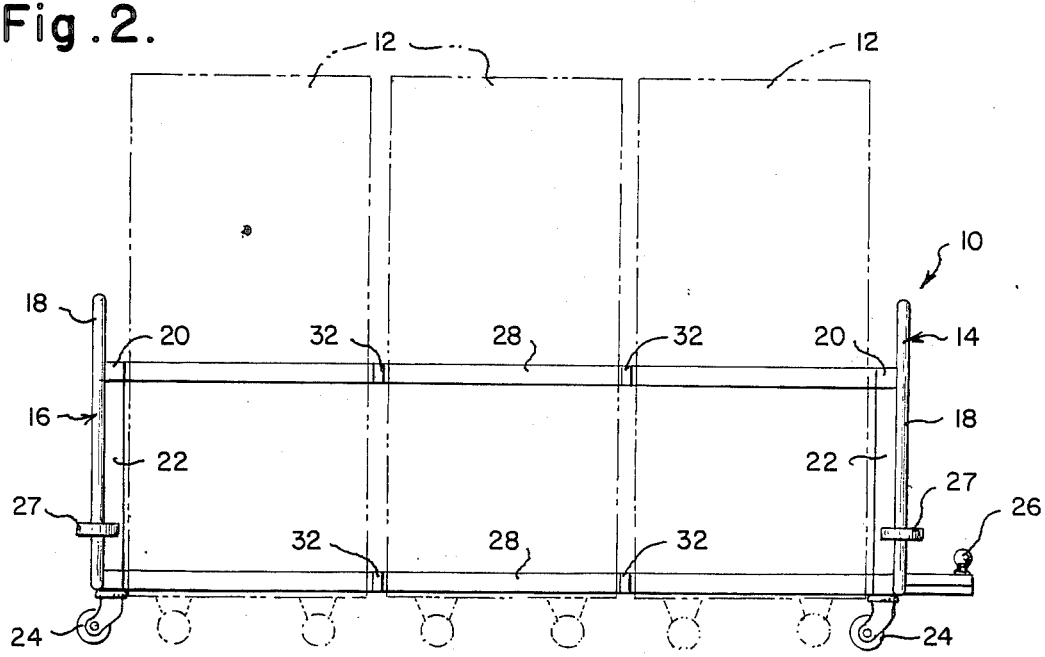
FIG. 2 is a side elevation view of the apparatus disclosed herein.

Referring now to the drawings wherein the showings are for the purposes of illustrating the present preferred embodiment of the invention only and not for purposes of limiting same, the figures show an apparatus 10 for transporting a plurality of wheeled carriers 12 which term, as used herein, may include carts, wheeled compartments or other wheeled apparatuses.

More particularly and with reference to the Figures, there is shown a plurality of wheeled carriers 12 disposed within transportation apparatus 10. Such transportation apparatus 10 includes a first vertical end frame 14 and a second vertical end frame 16 disposed parallel to and in spaced facing relation to first end frame 14. As such, first and second end frames 14 and 16, respectively, define the longitudinal ends of the transportation apparatus 10. Such first and second end frames, 14 and 16 each include a vertical rectangular frame member 18 which is provided with horizontal stiffener 20 and, preferably, vertical stiffener 22. In addition, first and second end frames 14 and 16, respectively, are each provided with wheels 24 attached to the lower portions thereof. Also, a trailer hitch 26 is preferably provided on first end frame 14 in order that transportation apparatus 10 may be towed by a prime mover (not shown). Bumpers 27 may be provided on rectangular frame 18 to prevent damage to transportation apparatus 10 and to the environment in which it will be utilized. If necessary, a coupling means may also be provided on second end frame 16 in order that more than one transportation apparatus 10 may be moved at once.

Preferably centrally affixed between horizontal stiffeners 20 on the first and second end frames 14 and 16, respectively, is a horizontal upper spine element 28. Similarly, centrally affixed between the lower areas of rectangular frames 18 of first and second end frames 14 and 16 is a horizontal lower spine element 30.

In order to divide the areas bounded by first and second vertical frames 14 and 16 and upper and lower spines 28 and 30, respectively, arms 32 are provided which extend horizontally perpendicular from upper and lower spines 28 and 30. As such, the arms 32 which extend from the upper spine 28 are disposed directly above corresponding arms 32 which extend from lower spine 30. It will be readily appreciated that the sizing of the overall transportation apparatus 10 will depend on the number of wheeled carriers 12 to be transported as a group, e.g., if apparatus 10 were designed to transport six (6) carriers 12 as a group, the overall structure of apparatus 10 would necessarily be large enough to accomodate six (6) carriers 12 within the bounds defined by the first and second end frames 14 and 16, respectively. In addition, the number of arms 32 required for a particular design must, in combination with end frames 14 and 16, provide a number of cells 33 equal to the number of carriers 12 to be transported, e.g., to accommodate six (6) carriers 12, two arms 32 will be provided on each side of upper spine 28 and two arms 32 will be provided on each side of lower spine 30 directly beneath the arms 32 on upper spine 28 thereby providing a total number of six (6) cells 33.

In order to retain wheeled carriers 12 within transportation apparatus 10, metallic or elastic straps 34 are provided to extend between first or second end frames 14 and 16, respectively, and the adjacent upper arms 32 to retain various carriers 12 adjacent such end frames 14 and 16, respectively, and between arms 32 to withhold carriers 12 in the central cells 33 of apparatus 10.

As such, the present invention provides solutions to various problems unsolved by the prior art. A notable feature of the herein disclosed transportation apparatus 10 is the flexibility with which wheeled carriers 12 may be transported. Because wheeled carriers 12 are inserted and removed from the sides of transportation apparatus 12, any carrier 12 may be inserted or removed from any cell 33 at any time without disrupting any other carrier 12. Obviously, therefore, the transportation apparatus 10 provides significant advantages over the prior art method of train-forming as a train need not be disassembled and reassembled to remove a particular carrier 12. In addition, since the carriers 12 ride on their own wheels, transportation apparatus 10 need not be grossly oversized to accomodate the weight of all carriers 12 and their contents and need not provide some means for loading carriers 12 onto transportation apparatus 10. Hence, the wheels on apparatus 10 are merely sized to bear the weight of apparatus 10 itself while allowing apparatus 10 to corral the wheeled carriers 12 to move a group thereof in unison.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. Apparatus for transporting articles, comprising:
   a. a plurality of wheeled carriers for containing said articles;
   b. means for transporting said plurality of wheeled carriers, comprising:
      (i) a first vertical end frame having wheels attached to the lower portion thereof;
      (ii) a second vertical end frame having wheels attached to the lower portion thereof, said second end frame being disposed parallel to and in spaced facing relation to said first end frame;
      (iii) an upper spine element extending between and affixed to the upper portions of said first and second end frames;
      (iv) a lower spine element extending between and affixed to the lower portions of said first and second end frames;
      (v) a plurality of horizontal arms extending from the lateral sides of said upper and said lower spine elements in vertically aligned relation so as to define a plurality of open-bottomed cells, each cell being of the horizontal cross-sectional shape of one of said wheeled carriers so as to allow a wheeled carrier to be horizontally inserted into said cell and roll on its wheels during transport;
   c. means for releasably securing said carriers within said cells.

2. Apparatus of claim 1 in which said means for releasably securing said carriers comprises straps connected between either one of said end frames and an adjacent one of said arms or between two of said arms in the same horizontal plane.

3. Apparatus of claim 1 further comprising means on said first end frame for allowing said apparatus to be towed by a prime mover.

* * * * *